Patented July 7, 1936

2,046,557

UNITED STATES PATENT OFFICE 2,046,557

FILLER, MARKING, AND COATING COMPOSITION

Thomas T. Holt, Cleveland Heights, Ohio

No Drawing. Application April 30, 1934,
Serial No. 723,275

4 Claims. (Cl. 106—5)

The present invention comprises a new and unique composition of matter having especial advantages in practical and commercial use for purposes of acting as a filler material, a marking substance, and a coating substance.

Referring to the utility of the invention for acting as a filler material, it is notable that such a composition is much needed today for employment in ornamental work, for instance, to cover exposed screw holes, fill slight flaw recesses or openings that develop in the manufacturing processes, such as blow holes, joints, etc., which flaws, or holes, or recesses must be concealed if possible to afford a finished surface or piece of work.

A definite problem presented in securing a filler composition for the purpose just referred to lies in the fact that in respect especially to metal surfaces, the metals are of different kinds and are supplied with many different types of finishes. It is, therefore, impossible to match all the finishes customarily used by employing known types of cold solders and patching pastes that are at present on the market. The finishes given to metals especially often require a greater or less amount of polished effects which must be truly matched if an efficient composition for the purposes of this invention is to be obtained.

The foregoing deals with the application of my invention as regards its use as a filler composition, and I have obtained a composition which is more suitable for the purposes stated than any thus far known to me, because my formula, as hereinafter presented, is suitable for application to all basic metals such as aluminum, copper, brass, their alloys, and all other such metals as may be supplied in fine powders that form a part of the formula. My composition according to such formula will effectively resist the average sun rays without melting, sagging, or running, and the shrinkage factor of the composition under weather changes is so small as to be negligible.

I have found, in addition to the utility of my invention for filler purposes as stated, that it affords new results when used as a marking composition. The composition may be molded, extruded, or otherwise formed into shapes, and as it comprises shellac wax and a metallic pigment, it is possible by the use of the composition to rub it over a roughened portion of cement, grained or rough wood, paper or similar surfaces in such a manner that various colors may be highlighted.

Because of the use of the shellac-wax element of my composition I find that when it is used for marking purposes or for applying colors, in the manner stated, to various surfaces, it is susceptible of being polished with a soft cloth to a high degree and by varying the amount of rubbing or polishing effect, various shades of colors may be produced. The polishing action, under such conditions, enables me to obtain natural metallic colored effects susceptible of being applied in such a way as to correctly and truly match actual metal bodies, or other surfaces, to which they are applied.

One of the most unique phases of the action of my composition, according to the last objective above stated, lies in the fact that when used as a crayon, or marker, on paper or other surfaces, the rubbing, buffing or polishing action thereon may be performed without the slightest smudging or smearing. Moreover, the composition is not soluble in water, and this is one of the most important advantages derived from its actual use.

As a coating composition, this invention may be advantageously used for coating of walls and statuary for purposes of ornamentation, under which conditions the composition may be employed in liquid form and applied by the use of a spray gun, or similar appliance, wherein the liquid may be maintained under heat control. After being so applied, the polishing may be performed readily to bring out the natural metallic surfaces and colorings.

As a preferred example of the formula of my invention, giving the relative proportions of ingredients that have been employed most satisfactorily, I supply the following:—

| | Ounces |
|---|---|
| Shellac wax | 16 |
| Metallic powder | 8 |

The process of admixture and treatment involves the heating of the shellac wax to a temperature of from 140 degrees F. to 350 degrees F. I find very satisfactory results may be produced when the wax is heated to 200 degrees F. The 140 degrees F. limit above specified is the low melting point, and the 350 degrees F. is the high melting point. Between these two melting points, the material is susceptible of being cast successfully or it may be subjected to the action of extrusion in order to shape it properly for use when finally hardened.

The metallic powder used will be finely comminuted and will be mixed thoroughly with the shellac wax, while the latter is in melted condition. It should be borne in mind that it is sometimes necessary to hold the melting point of the wax to such a degree that it will not discolor certain of the heat treated metallic powders or pigments that may be used for admixture therewith. This matter depends upon the type of powder employed and the heating points at which discolorations of such powders take place.

According to the invention, it will be understood that if a metal surface such as aluminum is to be treated for the purposes of filling cracks, screw holes, or other recesses, the composition employed by me will be one made up of proper proportions of shellac wax and aluminum powder. This is necessary, of course, in order to obtain effective matching of the filler composition with respect to the aluminum surface to which it is applied. A similar method of procedure would be followed in respect to the use of the filler on copper, bronze, brass, and other metallic surfaces.

While the solution of shellac wax and metallic powder is in melted liquid form, objects such as statues or the like may be dipped therein, removed therefrom, and when the composition has hardened, may be subjected to high polishing action to derive beautiful polished effects.

Another mode of use of the invention may be the following. It is possible to transfer from a piece of paper on to a cloth desired metallic finishes by placing the paper having a certain amount of the composition of my formula thereon face down upon cloth or similar material, and applying a heated iron to the side of the paper opposite that having the composition so as to cause the composition to be transferred to the cloth and to impregnate the latter to obtain an effective bond therewith. Thereafter, the polishing action may be given, if a highly polished surface is to be obtained.

I have found my composition to be of especial value for marking purposes because it may be used by artists for the making of drawings, wherein metallic colored surfaces are desirable to be portrayed, and the application of the composition as a crayon will afford splendid results in imparting metallic colors to such surfaces.

The rubbing or polishing of the composition so applied will not result in any smudging or smearing whatsoever, but the more the rubbing is performed, the greater the polished effect obtained.

So far as I am aware at the present time, I believe that the principal and important factor of novelty of my composition lies in the employment of the shellac wax ingredient. So far as I know, this wax, so difficult to obtain today, has some unique characteristic such that when it is combined with the metallic powder in the manner set forth, I am enabled to derive the splendid results which have been described hereinbefore. Just what action, physical, chemical, or otherwise, takes place in the combination of the ingredients of my composition, I am unable to state definitely, but the results obtained indicate that I am enabled to secure advantages of my composition for filler, coating and marking purposes such as have not heretofore been achieved in this art.

The shellac wax employed by me, may be in either crude, yellow, or bleached forms, as any one of these kinds of the wax performs successfully when compounded into a mixture in the manner previously set forth.

I am fully aware of the use heretofore of paraffine and other soft waxes in conjunction with pigments for the purpose of making marking crayons, but marking compositions so made, are so soft and partake of such characteristics that they result in smudging and smearing upon the slightest application of rubbing effect. Moreover, they are not permanent in their nature and do not afford other advantages such as obtainable by the use of my composition hereinbefore described.

In the use of my invention according to the formula of my composition, I find there are no oxidizing effects produced by the same, an important advantage bearing in mind that aluminum solders produce such effects and their use is undesirable and inefficient for this reason.

Having thus described my invention, what I claim as new and desire to secure by Letters Patent of the United States, is:—

1. The method of making a filler, coating and marking composition of the class described, which consists in heating shellac wax to a temperature between approximately 140 degrees F. as the minimum to a temperature of approximately 350 degrees F. as a maximum, and mixing with the said composition a powdered metallic pigment so that the pigment is uniformly distributed throughout the wax body to form a homogeneous mass.

2. The process of making a coating, filler and marking composition, which consists in heating the shellac wax to bring the same to melted condition, adding thereto heat treated colored metal powder, mixing the powder and wax thoroughly to distribute the powder through the wax mass, and controlling the temperature of the melted wax whereby to prevent discoloration of the heat treated powder.

3. A composition of matter of the class described, consisting of shellac wax only, and heat treated metal powder in substantially the proportions 2:1 by weight.

4. A composition of matter for the purposes described, consisting of shellac wax only, combined with a powdered metallic pigment.

THOMAS T. HOLT.